US006535659B2

(12) United States Patent
Levy

(10) Patent No.: US 6,535,659 B2
(45) Date of Patent: Mar. 18, 2003

(54) ELECTRICAL TESTING OF WAVEGUIDES

(75) Inventor: Jeffrey M. Levy, Tel Aviv (IL)

(73) Assignee: Chiaro Networks Ltd., Jerusalem (IL)

( * ) Notice: Subject to any disclaimer, the term of this patent is extended or adjusted under 35 U.S.C. 154(b) by 0 days.

(21) Appl. No.: 09/757,419

(22) Filed: Jan. 9, 2001

(65) Prior Publication Data

US 2003/0007716 A1 Jan. 9, 2003

(51) Int. Cl.[7] .......................... G02B 6/12; G01R 31/02
(52) U.S. Cl. ........................ 385/14; 385/147; 324/537
(58) Field of Search .......................... 385/14, 129–132, 385/1–3, 147, 40; 264/1, 24; 324/95, 133, 500, 512, 525, 537, 539, 765; 209/571–573

(56) References Cited

U.S. PATENT DOCUMENTS 4,737,014 A * 4/1988 Green ........................ 385/123
4,764,738 A * 8/1988 Fried ............................ 385/3
4,926,545 A * 5/1990 Pimpinella et al. ........... 385/14
5,142,228 A * 8/1992 Kingsbury .................. 324/230
5,999,667 A * 12/1999 Castoldi et al. ................ 385/2

FOREIGN PATENT DOCUMENTS

JP 6-11673 * 1/1994 ................ 385/129
WO WO 98/59276 12/1998

* cited by examiner

*Primary Examiner*—Akm E. Ullah
*Assistant Examiner*—Mike Stahl
(74) *Attorney, Agent, or Firm*—Ladas & Parry

(57) ABSTRACT

An integrated waveguide array structure allows electrical testing of each unit for shorts between waveguide elements of the array, and shorts between waveguides and the substrate prior to assembly into a larger optico-electronic unit. Multiple waveguide array structures are formed on a wafer, each waveguide array being provided with a cross bar connected to an electrical contact at each end, such that alternate waveguide elements of the array are electrically connected. When connected to a suitable testing device, the existence of shorts between adjacent elements can be immediately detected. Following testing, the cross bar and electrical contact are removed by scribing.

20 Claims, 5 Drawing Sheets

78 80 74 76 62 84 62 84 62 84 74 76 78

ELECTRICAL TESTING OF WAVEGUIDES

BACKGROUND OF THE INVENTION

1. Field of the Invention

This invention relates to a waveguide structure. More particularly this invention relates to a technique for manufacturing and electrically testing waveguide array units, which have been formed on a wafer in large numbers.

2. Description of the Related Art

Optical waveguides are employed today in optical beam deflectors, electro-optically controllable digital optical switching devices and optical interconnect units. Such devices are known from WO 98/59276, the disclosure of which is herein incorporated by reference.

A known integrated optical interconnect unit 10 employing a waveguide array structure 12 is illustrated in FIG. 1. In this device an input optical fiber 14 provides a beam 16, which impinges on an input lens assembly 18. The input lens assembly 18 provides a multiplicity of focused beams 20. The waveguide array structure 12 is formed on a substrate 22. Each waveguide element 24 of the waveguide array structure 12 receives one of the focused beams 20. Control signals applied to the beams being transmitted through each waveguide element 24 are supplied from a control electronic unit 26 via connector pads 28 and corresponding conductors 30. Having traversed the waveguide array structure 12, the exiting beams 32 are recombined in output optics 34.

Waveguide array structures are conventionally formed as shown in FIG. 2. A waveguide array 36 is carried on the substrate 38. The waveguide array 36 is controlled in an operating optical interconnect device by applying electrical fields along the length of the individual waveguides 40. The waveguide array 36 is conformed to the substrate 38 by etching along scribe lines 42. Electrical integrity of the array structure is therefore essential, and short circuits between the waveguides 40 cannot be tolerated.

Currently the electrical integrity of waveguide arrays is tested once the optical interconnect device has been assembled as an integrated unit. In the event that there has been a manufacturing defect, and an electrical short exists between the waveguide array elements, the entire waveguide array must be replaced, or in some cases the entire assembly must be discarded. This leads to increased cost due to wastage, increased costs of assembly, and delay in manufacturing.

SUMMARY OF THE INVENTION

It is therefore a primary object of some aspects of the present invention to provide an improved optical waveguide array structure which can be easily tested for electrical integrity.

It is another object of some aspects of the present invention to reduce the costs of assembling optical devices employing optical waveguide array units.

It is a further object of some aspects of the present invention to increase the reliability of integrated optical waveguide arrays.

These and other objects of the present invention are attained by an improved waveguide structure that allows electrical testing of each unit for shorts between waveguides and shorts between waveguides and the substrate (or ground) prior to assembly into a larger optico-electronic unit. Multiple waveguide array structures are formed on a wafer, each waveguide array structure being provided with a cross bar connected to an electrical contact at each end, such that alternate waveguide elements of the array are electrically connected. When connected to a suitable testing device, the existence of shorts between adjacent elements and shorts between elements and the substrate can be immediately detected. Following testing, the cross bar and electrical contact are removed by scribing.

The invention provides a method of manufacturing an integrated optical structure, comprising the steps of forming a waveguide array, which comprises a plurality of parallel optical waveguides that are spaced apart on a substrate. The waveguides are electrically conductive. The method further comprises electrically interconnecting even numbered waveguides of the waveguide array, electrically interconnecting odd numbered waveguides of the waveguide array, thereafter measuring electrical resistance between the even numbered waveguides and the odd numbered waveguides, and electrically disconnecting the even numbered waveguides from one another, and electrically disconnecting the odd numbered waveguides from one another.

According to an aspect of the invention, forming the waveguide array is performed by applying a mask to a wafer, wherein the mask defines a plurality of waveguide arrays, and a plurality of separable segments adjacent the waveguide arrays.

According to a further aspect of the invention, the step of electrically interconnecting the even numbered waveguides and the step of electrically interconnecting the odd numbered waveguides is performed by applying conductive interconnections on the separable segments, and following the step of measuring electrical resistance, separating the separable segments from the waveguide arrays.

The invention provides a method of manufacturing an integrated optical structure, comprising the steps of forming a waveguide array comprising a plurality of parallel optical waveguides that are spaced apart on a substrate, the waveguides being electrically conductive, electrically interconnecting a first set of the waveguides, electrically interconnecting a second set of the waveguides, thereafter measuring electrical resistance between the first set of the waveguides and the second set of the waveguides, and electrically disconnecting the first set of the waveguides from one another, and electrically disconnecting the second set of the waveguides from one another.

According to an aspect of the invention, the step of forming the waveguide array is performed by applying a mask to a wafer, wherein the mask defines a plurality of waveguide arrays, and a plurality of separable segments adjacent the waveguide arrays.

According to another aspect of the invention, the steps of electrically interconnecting the first set of the waveguides and electrically interconnecting the second set of the waveguides are formed by applying conductive interconnections on the separable segments, and following said step of measuring, separating the separable segments from the waveguide arrays.

The invention provides a method of manufacturing an integrated optical waveguide structure, comprising the steps of forming a waveguide array comprising a plurality of parallel optical waveguides that are spaced apart on a substrate, thereby defining a first group and a second group of optical waveguides, wherein members of the first group alternate on the substrate with members of the second group, disposing ohmic contacts on the waveguides, forming a first electrical interconnection of the first group on the substrate, forming a second electrical interconnection of the second group on the substrate, measuring an electrical resistance between the first electrical interconnect on and the second electrical interconnection, and thereafter removing the first electrical interconnection and the second electrical interconnection.

According to another aspect of the invention, the steps of forming the first electrical interconnection and the second electrical interconnection are performed by forming first extensions of the first group on a first terminal portion of the substrate, forming second extensions of the second group on a second terminal portion of the substrate, forming a first conductive bar across the first extensions, and forming a second conductive bar across the second extensions.

According to an additional aspect of the invention, the step of removing is performed by forming a first scribe line on the first terminal portion, and forming a second scribe line on the second terminal portion, separating the first terminal portion from a central portion of the substrate along the first scribe line, and separating the second terminal portion from the central portion of the substrate along the second scribe lane.

According to an aspect of the invention, the waveguide array includes a plurality of waveguide arrays, and the substrate is common to the waveguide arrays, and a method includes the step of interconnecting each the first electrical interconnection of each of the waveguide arrays.

Yet another aspect of the invention includes the step of interconnecting the second electrical interconnection of each of the waveguide arrays.

The invention provides an optical waveguide array structure, comprising a substrate having formed thereon a plurality of optical waveguides, wherein a first set of alternating ones of the waveguides is extended from a central segment of the substrate onto a first terminal segment of the substrate, a second set of alternating ones of the waveguides is extended from the central segment onto a second terminal segment of the substrate, and a first conductive cross-link is disposed on the first terminal segment connecting the first set of the waveguides.

According to a further aspect of the invention, a second conductive cross-link is disposed on the second terminal segment connecting the second set of the waveguides.

Yet another aspect of the invention, includes a first scribe line disposed between the central segment and the first terminal segment, and a second scribe line disposed between the central segment and the second terminal segment.

According to still another aspect of the invention, the waveguides are parallel.

According to an additional aspect of the invention, the waveguide array includes a plurality of waveguide arrays disposed on the substrate, and a first interconnection between the first conductive cross-link of at least two of the waveguide arrays on the substrate.

According to an aspect of the invention, there is a second interconnection between the second conductive cross-link of the at least two waveguide arrays on the substrate.

The invention provides a method of manufacturing an integrated optical waveguides structure, comprising the steps of forming a waveguide array comprising a plurality of parallel optical waveguides that are spaced apart on a substrate, thereby defining a first group and a second group of optical waveguides, wherein members of the first group alternate on the substrate with members of the second group, disposing first ohmic contacts on the waveguides, disposing a second ohmic contact on the substrate, forming an electrical interconnection of the first group on the substrate, measuring an electrical resistance between one of the first ohmic contacts and the second ohmic contact, and thereafter removing the electrical interconnection.

BRIEF DESCRIPTION OF THE DRAWING

For a better understanding of these and other objects of the present invention, reference is made to the detailed description of the invention, by way of example, which is to be read in conjunction with the following drawings, wherein.

DESCRIPTION OF THE PREFERRED EMBODIMENT

In the following description, numerous specific details are set forth in order to provide a thorough understanding of the present invention. It will be apparent however, to one skilled in the art that the present invention may be practiced without these specific details. In other instances well known circuits and structures have not been shown in detail in order not to unnecessarily obscure the present invention.

Figure 1:
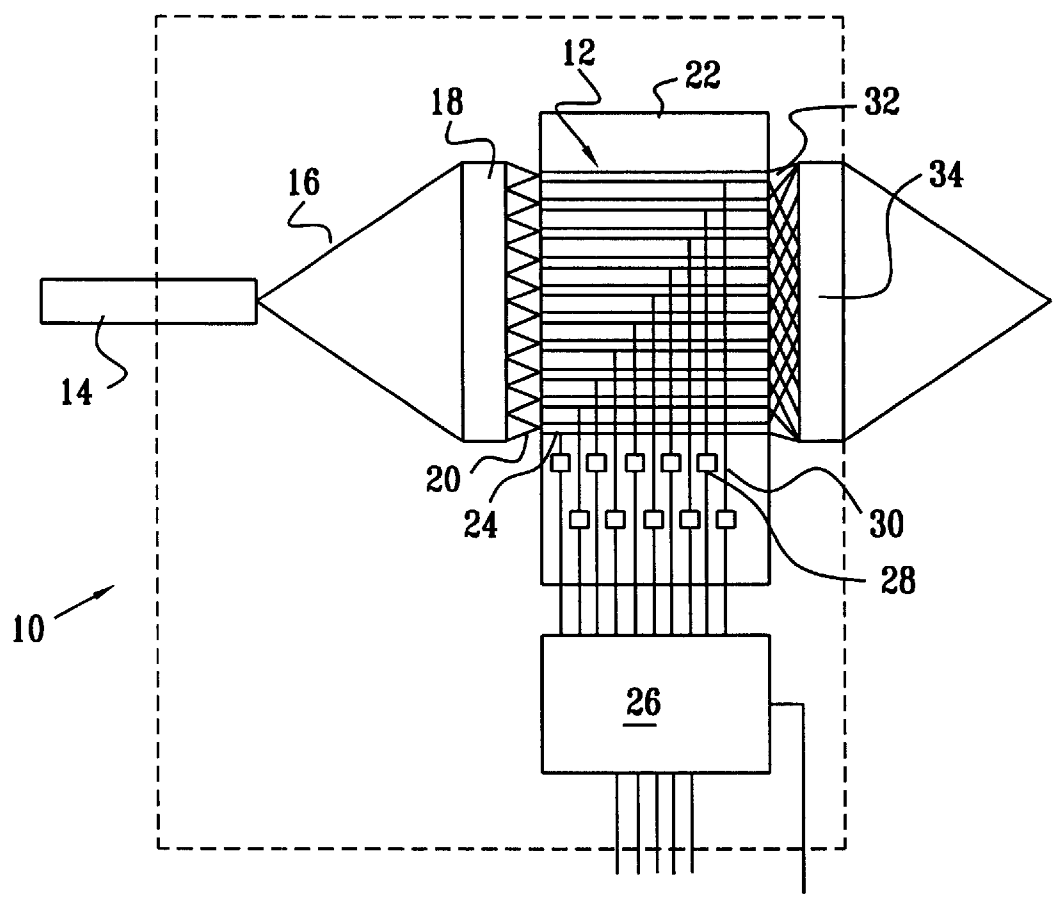
FIG. 1 is a schematic of an optical device employing a waveguide array according to the prior art.
Figure 2:
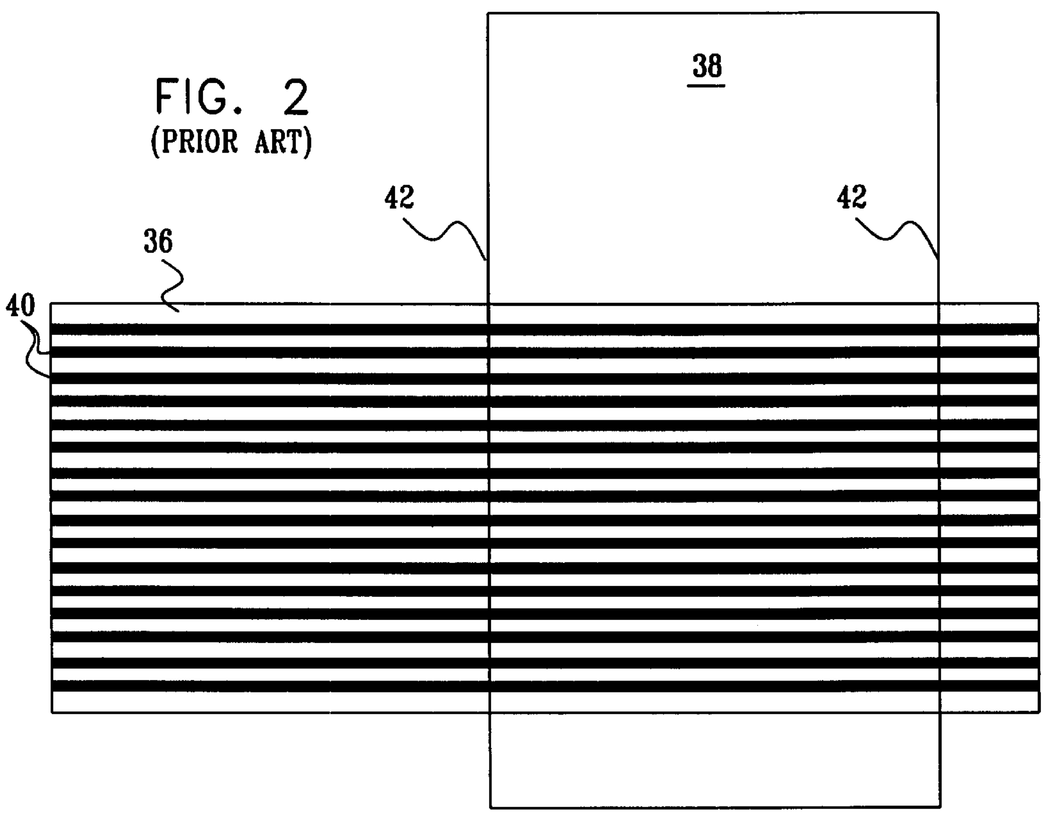
FIG. 2 illustrates an integrated waveguide array structure according to the prior art.
Figure 3:
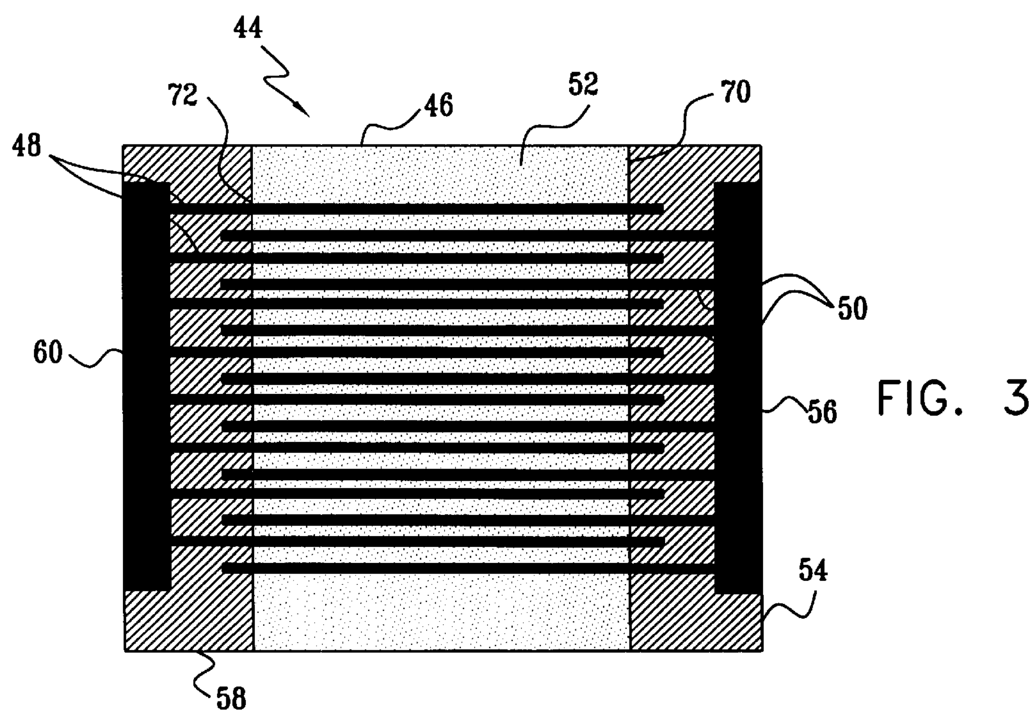
FIG. 3 is a diagram of an integrated waveguide array according to a preferred embodiment of the invention.

Turning now to the drawings, and to FIG. 3, there is shown a waveguide array 44 according to a preferred embodiment of the invention. A central segment 46 comprises a plurality of parallel waveguide elements 48, 50 carried on a substrate 52. The waveguide elements 48 alternate with the plurality of parallel waveguide elements 50. The substrate 52 is typically an N-doped GaAs layer disposed between an N-type ohmic contact and a cladding layer, usually N-doped AlGaAs. It includes a core layer, a GaAs PN junction, a cladding layer, preferably P doped AlGaAs, and a cap layer overlaying the cladding layer. P-type ohmic contacts, typically formed of Ti/Au, are provided along the length of each of the individual waveguide elements 48, 50.

As is known to the art, the array is constructed by configuring regions on a wafer to define he upper and lower surfaces of the array. Then the upper and lower surfaces are iteratively coated with metal layers and insulative layers in a direction which is generally perpendicular to the upper and lower surfaces to form appropriate electrical interconnections. The waveguide elements 48, 50 are separated from one another by etching, and a polyimide insulative layer fills the resulting gaps. As the construction of such waveguide units is well known, further details are not provided herein in the interest of brevity.

The central segment 46 is preferably constructed as described above. However there are other well known methods of constructing waveguide arrays, many of which may be suitable for practicing the invention.

The waveguide elements 48 end blindly in a right terminal segment 54. The right terminal segment 54 also carries extensions of the waveguide elements 50, which are interconnected by a common conductive cross bar 56. In like manner the waveguide elements 50, which alternate with the waveguide elements 48, end blindly in a left terminal segment 58. The left terminal segment 58 also carries extensions of the waveguide elements 48, which are interconnected by the common conductive cross bar 60.

Figure 4:
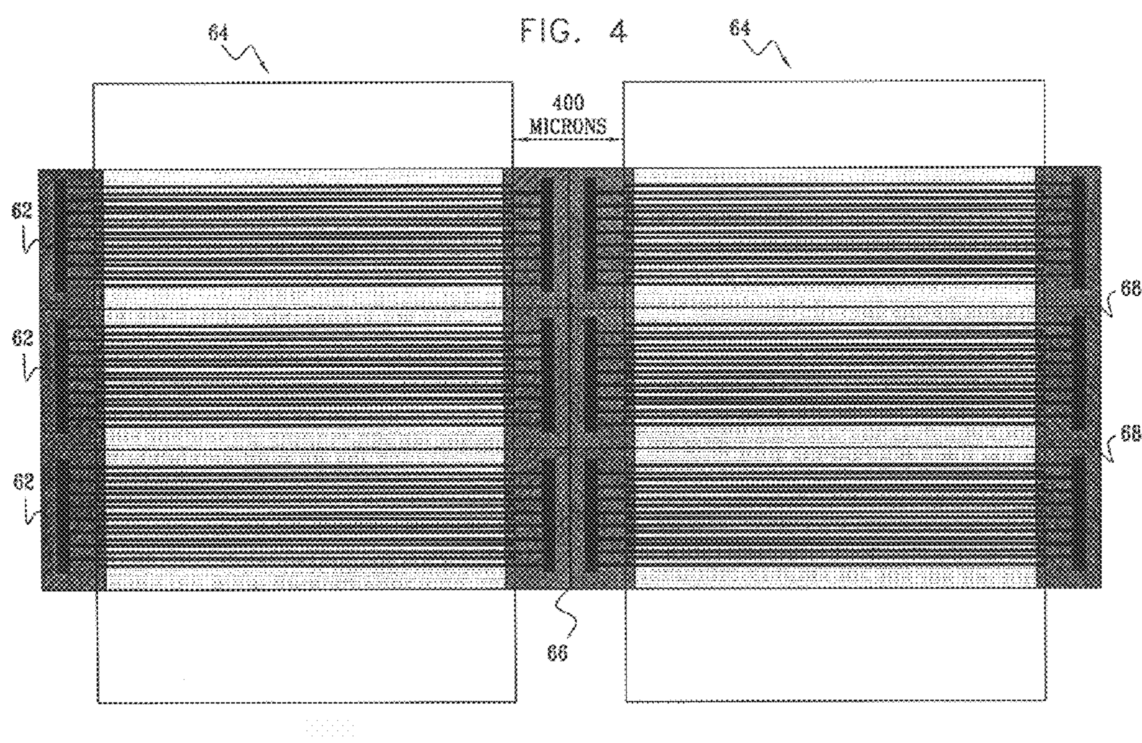
FIG. 4 is a diagram illustrating a plurality of integrated waveguide arrays according to an alternate embodiment of the invention.

The right terminal segment 54 and the left terminal segment 58 are of identical construction, and are similar in structure to the central segment 46, except that the polyimide insulative layer is preferably omitted. In manufacturing practice, a multiplicity of arrays 62, each having the structure of the waveguide array 44, are laid out on a wafer using suitable masks, as shown in FIG. 4. The arrays 62 are arranged in a plurality of rows 64, separated by scribe lines 66, 68, and are separated following assembly.

Referring again to FIG. 3, an individual waveguide array 44 is electrically tested by applying leads of a suitable test instrument (not shown), such as an ohmmeter, to each of the cross bars 56, 60. It will be evident that the waveguide elements 48 are all at a common electrical potential, and the waveguide elements 50 are also at a common electrical potential. But the waveguide elements 48 are insulated from the waveguide elements 50. Therefore the resistance between the waveguide elements 48 and the waveguide elements 50 will be very high if manufacture has been successful. Seeing a low resistance, or an electrical short, between the waveguide elements 48 and the waveguide elements 50 using the test instrument indicates a manufacturing defect.

After completion of electrical testing, the right terminal segment 54 and the left terminal segment 58 are separated from the central segment 46 using scribe lines 70, 72, and discarded. The central segment 46 is then ready for assembly in an optico-electronic device according to a particular application without fear of malfunction due to electrical shorts in the waveguide array. It will be evident that the testing has been accomplished without directly contacting any active areas of the waveguide elements, so that the possibility of physical damage to the structure is virtually eliminated.

While the addition of the right terminal segment 54 and left terminal segment 58 increases the real estate required by each waveguide array on a wafer in an order of 5–10%, and adds somewhat to complexity of the wafer scribing process, the loss of yield is insignificant when compared to the economic benefit that is accorded the manufacturing process by the practice of the technique disclosed herein.

Figure 5:
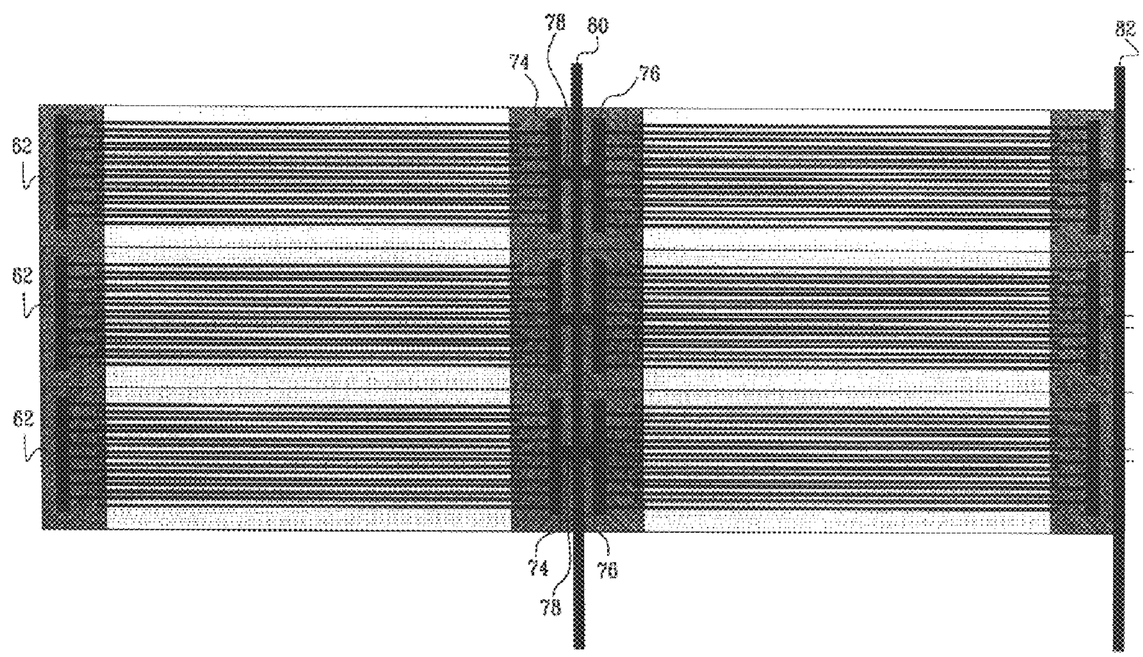
FIG. 5 illustrates a plurality of integrated waveguide arrays according to another alternate embodiment of the invention.

Referring now to FIG. 5, there is shown an alternate embodiment of the invention in which a multiplicity of arrays 62 are arranged on a chip. This is similar to the first embodiment, except now the cross bars 74, 76 are electrically interconnected by links 78, and the links 78 are electrically connected by a common transverse bar 80. Now, by applying a lead of the test instrument (not shown) to the common transverse bar 80, and to a second transverse bar 82, it is possible to ascertain the electrical integrity of multiple units simultaneously. Other arrangements of the transverse bars will occur to those skilled in the art. It is possible to connect even larger groupings of the arrays 62 so that they can be simultaneously tested. Many variations in the arrangement of the electrical links connecting the arrays 62 will occur to those skilled in the art. The mask car readily be changed to appropriately subdivide the common transverse bar 80 and the transverse bar 82 so as to achieve a desired granularity as to the number of shorts that can be detected in one testing operation. It is only necessary to select the appropriate tradeoff between testing efficiency and loss of chip real estate as may be desired for a particular application.

Figure 6:
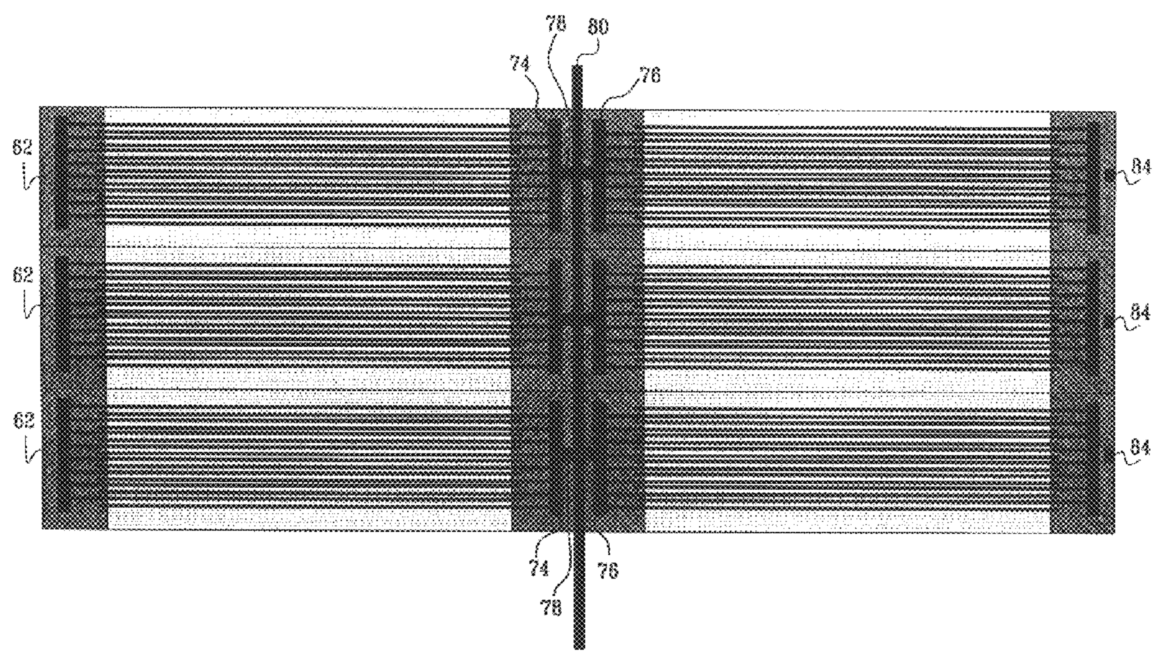
FIG. 6 illustrates a plurality of integrated waveguide arrays according to yet another alternate embodiment of the invention.

A second alternate embodiment of the invention is shown in FIG. 6, which is similar to the first alternate embodiment, but lacks the transverse bar 82. When testing of the arrays 62 is conducted, one lead of the test instrument (not shown) is placed on the common transverse bar 80, and other test leads are placed individually, either sequentially, or simultaneously, on individual pads 84, depending on the sophistication of the test instrument (not shown). This embodiment requires more lead placement than the first alternate embodiment, but has the advantage that individual arrays 62 having electrical shorts can be immediately identified and marked for rejection or repair.

In the embodiments shown above, testing for shorts between the individual elements and the substrate can be conducted as described above, except now one of the connections is placed on a contact (not shown) on the back side of the substrate 52, and the other contact placed on a common transverse bar, link, or pad.

While this invention has been explained with reference to the structure disclosed herein, it is not confined to the details set forth and this application is intended to cover any modifications and changes as may come within the scope of he following claims:

What is claimed is:

1. A method of manufacturing an integrated optical structure, comprising the steps of:

forming a waveguide array comprising a plurality of parallel optical waveguides that are spaced apart on a substrate, said waveguides begin electrically conductive;

electrically interconnecting even numbered waveguides of said waveguide array;

electrically interconnecting odd numbered waveguides of said waveguide array; and thereafter measuring electrical resistance between said even numbered waveguides and said odd numbered waveguides;

electrically disconnecting said even numbered waveguides from one another; and electrically disconnecting said odd numbered waveguides from one another.

2. The method according to claim 1, wherein said step of forming said waveguide array is performed by:

applying a mask to a wafer, wherein said mask defines a plurality of waveguide arrays, and a plurality of separable segments adjacent said waveguide arrays.

3. The method according to claim 2, wherein said steps of electrically interconnecting said even numbered waveguides and electrically interconnecting said odd numbered waveguides are performed by applying conductive interconnections on said separable segments; and further comprising the step of following said step of measuring, separating said separable segments from said waveguide arrays.

4. A method of manufacturing an integrated optical structure, comprising the steps of:

forming a waveguide array comprising a plurality of parallel optical waveguides that are spaced apart on a substrate, said waveguides being electrically conductive;

electrically interconnecting a first set of said waveguides;

electrically interconnecting a second set of said waveguides; and thereafter measuring electrical resistance between said first set of said waveguides and said second set of said waveguides;

electrically disconnecting said first set of said waveguides from one another; and electrically disconnecting said second set of said waveguides from one another.

5. The method according to claim 4, wherein said step of forming said waveguide array is performed by:

applying a mask to a wafer, wherein said mask defines a plurality of waveguide arrays, and a plurality of separable segments adjacent said waveguide arrays.

6. The method according to claim 5, wherein said steps of electrically interconnecting said first set of said waveguides and electrically interconnecting said second set of said waveguides are performed by applying conductive interconnections on said separable segments; and further comprising the step of following said step of measuring, separating said separable segments from said waveguide arrays.

7. A method of manufacturing an integrated optical waveguide structure, comprising the steps of:

forming a waveguide array comprising a plurality of parallel optical waveguides that are spaced apart on a substrate, thereby defining a first group and a second group of optical waveguides, wherein members of said first group alternate on said substrate with members of said second group;

disposing ohmic contacts on said waveguides;

forming a first electrical interconnection of said first group on said substrate;

forming a second electrical interconnection of said second group on said substrate;

measuring an electrical resistance between said first electrical interconnection and said second electrical interconnection; and thereafter removing said first electrical interconnection and said second electrical interconnection.

8. The method according to claim 7, wherein said steps of forming said first electrical interconnection and said second electrical interconnection are performed by:

forming first extensions of said first group on a first terminal portion of said substrate;

forming second extensions of said second group on a second terminal portion of said substrate;

forming a first conductive bar across said first extensions; and forming a second conductive bar across said second extensions.

9. The method according to claim 8, wherein said step of removing is performed by:

forming a first scribe line on said first terminal portion;

forming a second scribe line on said second terminal portion; and thereafter separating said first terminal portion from a central portion of said substrate along said first scribe line; and separating said second terminal portion from said central portion of said substrate along said second scribe line.

10. The method according to claim 7, wherein said waveguide array comprises a plurality of waveguide arrays, and said substrate is common to said waveguide arrays, further comprising the step of interconnecting each said first electrical interconnection of each of said waveguide arrays.

11. The method according to claim 10, further comprising the step of interconnecting said second electrical interconnection of each of said waveguide arrays.

12. An optical waveguide array structure, comprising:

a substrate having formed thereon a plurality of optical waveguides;

a first set of alternating ones of said waveguides being extended from a central segment of said substrate onto a first terminal segment of said substrate;

a second set of alternating ones of said waveguides being extended from said central segment onto a second terminal segment of said substrate;

a first conductive cross-link disposed on said first terminal segment connecting said first set of said waveguides;

a first scribe line disposed between said central segment and said first terminal segment; and a second scribe line disposed between said central segment and said second terminal segment.

13. The waveguide array structure according to claim 12, further comprising a second conductive cross-link disposed on said second terminal segment connecting said second set of said waveguides.

14. The waveguide array structure according to claim 12, wherein said waveguides are parallel.

15. The waveguide array structure according to claim 13, wherein said waveguide array comprises a plurality of waveguide arrays disposed on said substrate, further comprising:

a first interconnection between said first conductive cross-link of at least two of said waveguide arrays on said substrate.

16. The waveguide array structure according to claim 15, further comprising a second interconnection between said second conductive cross-link of said at least two waveguide arrays on said substrate.

17. A method of manufacturing an integrated optical waveguide structure, comprising the steps of:

forming a waveguide array comprising a plurality of parallel optical waveguides that are spaced apart on a substrate, thereby defining a first group and a second group of optical waveguides, wherein members of said first group alternate on said substrate with members of said second group;

disposing first ohmic contacts on said waveguides;

disposing a second ohmic contact on said substrate;

forming an electrical interconnection of said first group on said substrate;

measuring an electrical resistance between one of said first ohmic contacts and said second ohmic contact; and thereafter removing said electrical interconnection.

18. The method according to claim 17, wherein said steps of forming said electrical interconnection are performed by:

forming extensions of said first group on a first terminal portion of said substrate; and forming a conductive bar across said extensions.

19. The method according to claim 17, wherein said step of removing is performed by:

forming a scribe line on a terminal portion of said substrate; and separating said terminal portion from a central portion of said substrate along said scribe line.

20. The method according to claim 17, wherein said waveguide array comprises a plurality of waveguide arrays, and said substrate is common to said waveguide arrays, further comprising the step of interconnecting each said electrical interconnection of each of said waveguide arrays.

* * * * *